(12) United States Patent
Ishii

(10) Patent No.: US 9,025,188 B2
(45) Date of Patent: May 5, 2015

(54) INFORMATION PROCESSING SYSTEM ACQUIRING ACCESS RIGHT TO DELIVERY DESTINATION OF IMAGE DATA, METHOD OF PROCESSING INFORMATION, IMAGE INPUTTING APPARATUS, INFORMATION PROCESSING APPARATUS, AND PROGRAM

(71) Applicant: Yuichi Ishii, Tokyo (JP)

(72) Inventor: Yuichi Ishii, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/016,312

(22) Filed: Sep. 3, 2013

(65) Prior Publication Data

US 2014/0071484 A1 Mar. 13, 2014

(30) Foreign Application Priority Data

Sep. 7, 2012 (JP) .................................. 2012-196837

(51) Int. Cl.
  *G06F 15/00* (2006.01)
  *G06K 1/00* (2006.01)
  *G06F 3/12* (2006.01)
  *G06F 21/60* (2013.01)

(52) U.S. Cl.
  CPC ............ *G06F 3/1296* (2013.01); *G06F 21/608* (2013.01)

(58) Field of Classification Search
  None
  See application file for complete search history.

(56) References Cited

U.S. PATENT DOCUMENTS

| 8,179,542 | B2 | 5/2012 | Yagi | |
|---|---|---|---|---|
| 2004/0125414 | A1* | 7/2004 | Ohishi et al. | 358/402 |
| 2007/0182985 | A1* | 8/2007 | Ciriza et al. | 358/1.15 |
| 2008/0043278 | A1* | 2/2008 | Suzuki | 358/1.15 |
| 2008/0301792 | A1 | 12/2008 | Hong | |
| 2009/0300757 | A1 | 12/2009 | Tanaka et al. | |
| 2011/0197074 | A1* | 8/2011 | Foley et al. | 713/186 |

FOREIGN PATENT DOCUMENTS

| JP | 2008-097586 | 4/2008 |
|---|---|---|
| JP | 2008-301480 | 12/2008 |
| JP | 2009-289164 | 12/2009 |

\* cited by examiner

*Primary Examiner* — Ming Hon
(74) *Attorney, Agent, or Firm* — IPUSA, PLLC

(57) ABSTRACT

An information processing system including an image inputting apparatus including a first certification control unit that sends a certification request, in which a public key certificate read from a recording medium is designated, to a certification apparatus connected with the image inputting apparatus through a network and receives proof data indicating that certification is completed from the certification apparatus, a delegating unit that delegates the proof data to the information processing apparatus, which is connected with the image inputting apparatus through the network, and a sending unit that sends a delivery request for delivering image data input by the image inputting apparatus to the information processing apparatus, and an information processing apparatus which acquires an access right to a delivery destination of the image data using the proof data delegated by the delegating unit.

8 Claims, 13 Drawing Sheets

FIG.4
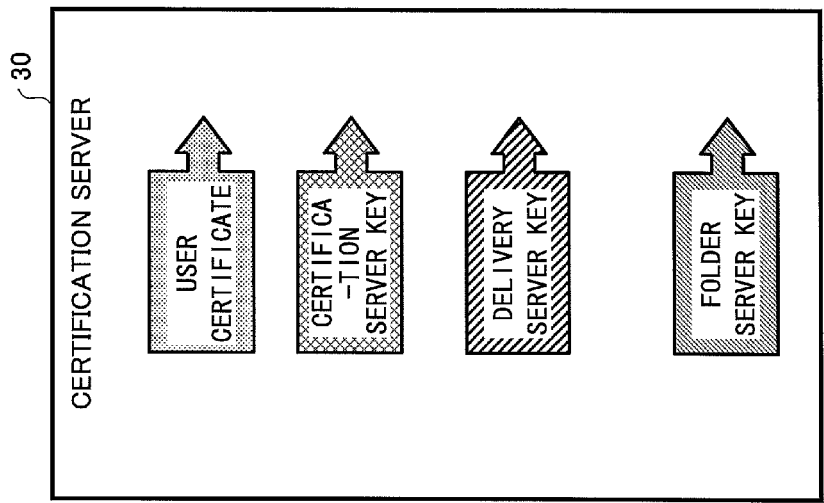
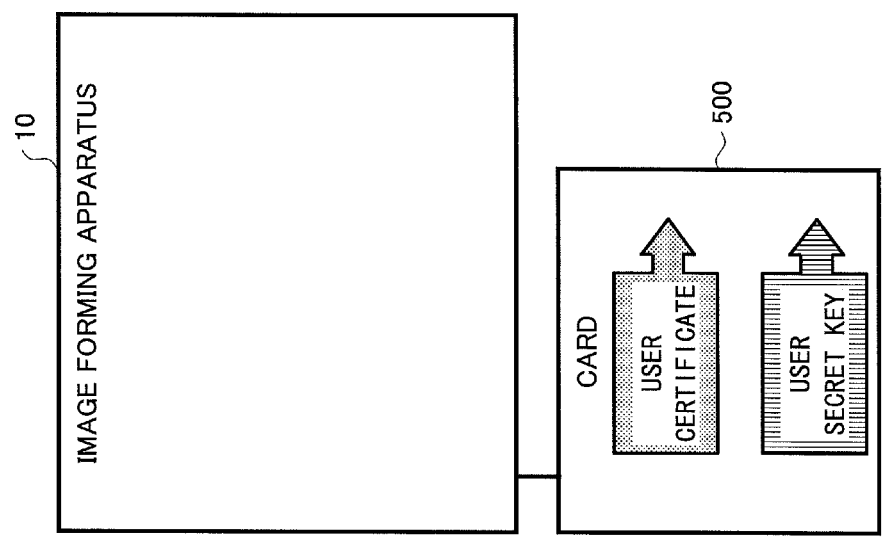

INFORMATION PROCESSING SYSTEM ACQUIRING ACCESS RIGHT TO DELIVERY DESTINATION OF IMAGE DATA, METHOD OF PROCESSING INFORMATION, IMAGE INPUTTING APPARATUS, INFORMATION PROCESSING APPARATUS, AND PROGRAM

BACKGROUND OF THE INVENTION

1. Field of the Invention

The present invention generally relates to an information processing system, a method of processing information, an image inputting apparatus, an information processing apparatus, and a program.

2. Description of the Related Art

An example of a delivery system is provided to transfer an image data scanned by an image forming apparatus including a scanner to a delivery server and to cause the delivery server to deliver the scanned image data to a preset delivery destination.

Because a delivery process is controlled by the delivery server, it is possible to reduce a load on an image forming apparatus whose hardware resources such as a memory and a CPU are insufficient. As a result, the hardware resources of the image forming apparatus can be allocated to primary functions such as printing, scanning, and copying.

Depending on a delivery method of the delivery server or a delivery destination for the delivery server, a user may be requested to input certification information for acquiring the access authority to the delivery destination. For example, if the delivery destination is a shared folder, a user who has access authority to the shared folder is requested to input a user name and a password for the user. In this case, the user inputs certification information when the delivery function is used in addition to an input for login to the image forming apparatus.

A single sign-on is spuriously substantialized as follows. The user name and the password input at the time of login to the image forming apparatus are set to be the same as the user name and the password for acquiring access authority to a delivery destination. The user name and the password input at the time of login are presented by the image forming apparatus to the delivery destination. The user needs not to additionally input the user name and the password when the delivery function is used.

On the other hand, in recent years, PKI certification using a smart card (an IC card) is used more in logging in an image forming apparatus. In order to be certified by this PKI certification, the user sets the smart card in the card reader and inputs a personal identification number (PIN) for allowing access to information inside the smart card.

Patent Document 1: Japanese Laid-Open Patent Application No. 2008-97586

Patent Document 2: Japanese Laid-Open Patent Application No. 2009-289164

SUMMARY OF THE INVENTION

Accordingly, embodiments of the present invention provide a novel and useful information processing system, a method of processing information, an image inputting apparatus, an information processing apparatus, and a program solving one or more of the problems discussed above.

One aspect of the embodiments of the present invention may be to provide an information processing system including an image inputting apparatus and an information processing apparatus, wherein the image inputting apparatus includes a first certification control unit that sends a certification request, in which a public key certificate read from a recording medium is designated, to a certification apparatus connected with the image inputting apparatus through a network and receives proof data indicating that certification is completed from the certification apparatus, a delegating unit that delegates the proof data to the information processing apparatus, which is connected with the image inputting apparatus through the network, and a sending unit that sends a delivery request for delivering image data input by the image inputting apparatus to the information processing apparatus, wherein the information processing apparatus acquires an access right to a delivery destination of the image data using the proof data delegated by the delegating unit.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 4 explains data stored in a card or a certification server in an initial state.

DETAILED DESCRIPTION OF THE PREFERRED EMBODIMENTS

A description is given below, with reference to the FIG. 1 through FIG. 13 of embodiments of the present invention. Where the same reference symbols are attached to the same parts, repeated description of the parts is omitted.

Reference symbols typically designate as follows:

1: delivery system;

10: image forming apparatus;
11: delivery data inputting unit;
12: card access unit;
13: certification control unit;
14: PKI certification control unit;
20: delivery server;
30: certification server;
40: user administrating server;
50: folder server;
101: CPU;
102: memory;
103: auxiliary memory device;
104: network I/F;
105: image outputting unit;
106: image reading unit;
107: external device I/F;
108: displaying unit;
109: operating unit;
110: card reader; and
500: card.

Figure 1:
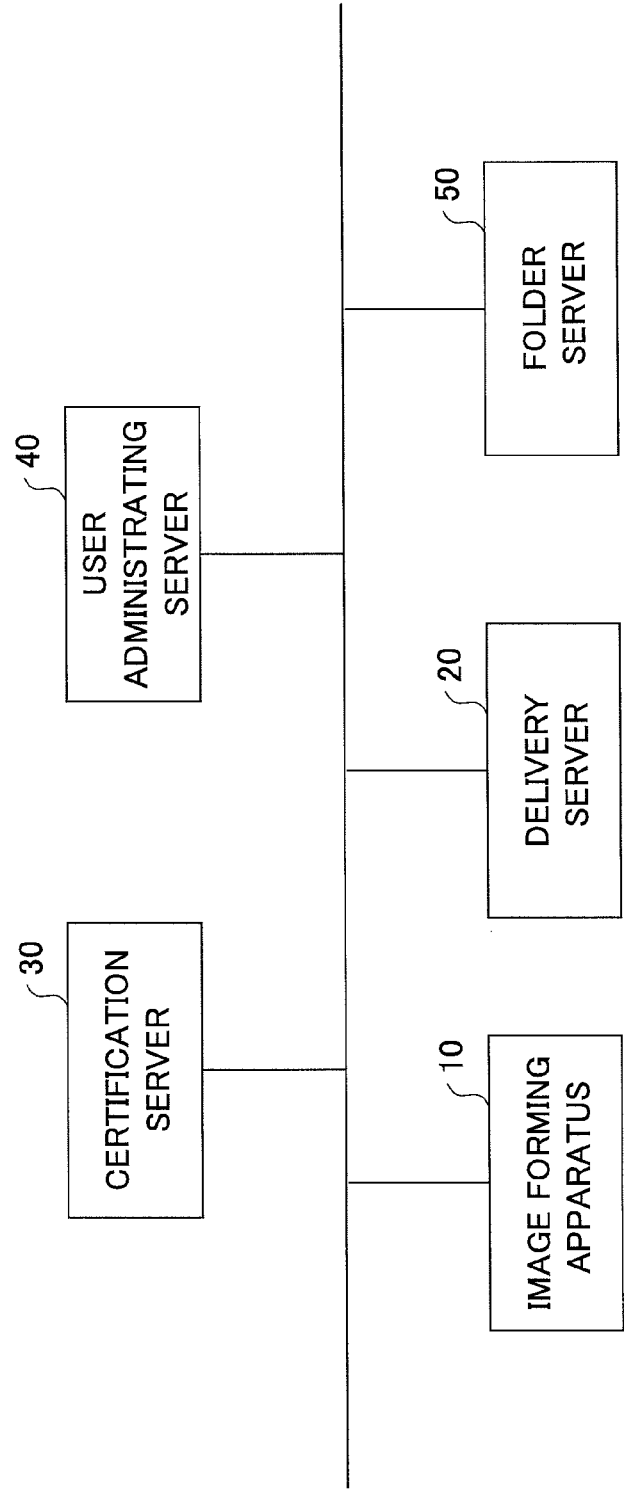
FIG. 1 illustrates an exemplary structure of a delivery system according to a first embodiment of the present invention.

Hereinafter, the embodiment of the present invention is described based on the figures. FIG. 1 illustrates an exemplary structure of a delivery system according to a first embodiment of the present invention. Referring to FIG. 1, the delivery system 1 includes one or more image forming apparatuses 10, a delivery server 20, a certification server 30, a user administrating server 40, a folder server 50, and so on. These servers and apparatuses are mutually connected by a local area network (LAN) or a wired or wireless network such as the Internet so that the servers and apparatuses are mutually communicable.

The image forming apparatus 10 reads image data to be delivered from an original. The delivery server 20 performs a delivery process for the image data read by the image forming apparatus 10. Referring to FIG. 1, the folder server 50 is exemplified as a delivery destination of the image data. The folder server 50 is at the delivery destination and includes a folder structure.

The certification server 30 is a computer for certifying a user of the image forming apparatus 10. Within the first embodiment, the certification server 30 certifies using Kerberos certification. Therefore, the certification server 30 plays a role as a key distribution center (KDC) in Kerberos certification. Said differently, the certification server 30 has a function of an authentication server (AS) for certifying the user, a function as a ticket granting server (TGS) for issuing a ticket allowing a use of services of the delivery server 20, the folder server 50, or the like. The certification server 30 may be realized by, for example, a domain controller, into which Active Directory is introduced.

The user administrating server 40 is a computer which manages attribute information or the like of users of the image forming apparatus 10 in an integrated fashion. The certification server 30 may additionally have the functions of the user administrating server 40. However, in a case where the certification server 30 is a domain controller, expandability of an administration structure of the attribute information of the users is insufficient. For example, it is difficult to administrate the expanded attribute information, which is required in using the image forming apparatus 10, in the certification server 30. Therefore, in the first embodiment, the user administration server 40 is installed to enable the administration of the expanded attribute information.

Figure 2:
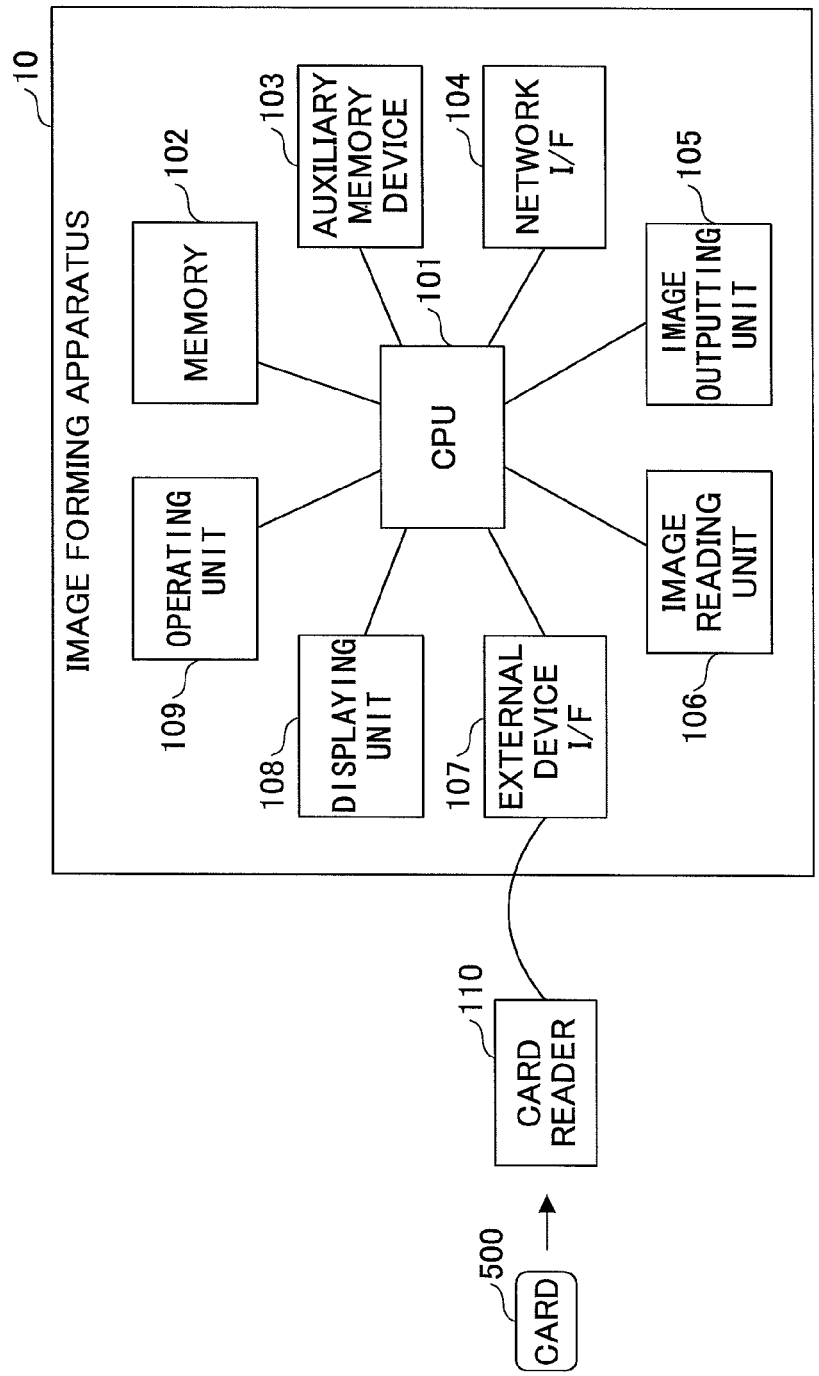
FIG. 2 illustrates an exemplary structure of hardware of the image forming apparatus of the first embodiment.

FIG. 2 illustrates an exemplary hardware structure of the image forming apparatus of the embodiment. Referring to FIG. 2, the image forming apparatus 10 is a multifunction peripheral substantializing a plurality of functions such as scanning, copying, printing or the like in one apparatus. The image forming apparatus 10 includes a CPU 101, a memory 102, an auxiliary memory device 103, a network I/F 104, an image outputting unit 105, an image reading unit 106, an external device I/F 107, a displaying unit 108, and an operating unit 109, or the like.

A program substantializing functions of the image forming apparatus 10 is recorded (installed) in the auxiliary memory device 103 which is not volatile such as a hard disk drive (HDD). The auxiliary memory device 103 stores necessary files, data and so on in addition to the installed program. Further, an example of the auxiliary memory device 103 is a hard disk drive (HDD), a non-volatile RAM, or the like. The memory 102 reads out the program from the auxiliary memory device 103 when the program is instructed to be invoked and stores the program in the memory device 102. The CPU 101 realizes a function related to the image forming apparatus 10 in conformity with the program stored in the memory 102. The network I/F 104 is used as an interface for connecting the image forming apparatus to the network.

The displaying unit 108 includes a liquid crystal display (LCD) or the like. The displaying unit 108 displays an operation screen, a message, or the like. The operating unit 109 is formed by a button or a key (hardware) for receiving operation inputs input by the user. The displaying unit 108 and the operating unit 109 may be integrally formed as an operation panel.

The image reading unit 106 reads the image data from the original. The image outputting unit 105 outputs (prints) the image data.

The external device I/F 107 is an interface for connecting the image forming apparatus 10 to a card reader used to input user information for the certification. The external device I/F 107 is, for example, a USB port (a USB host interface), a serial port, or the like. The card reader 110 reads information from the card 500 and includes a hardware interface (for example, a USB connector, a serial interface, or the like) connectable to the external device I/F 107. The card reader 110 may be built in the image forming apparatus 10. The card reader 110 may be a contact type or a noncontact type. Within the first embodiment, the card 500 is a smart card (an IC card). The card 500 stores a public key certificate (hereinafter, referred to as a "user certificate") issued for each user.

Within the first embodiment, the cards 500 are previously distributed to the corresponding users. Depending on a security level necessary for an operation of the image forming apparatus 10, a plurality of users may commonly share one card 500. The type of the card 500 distributed to the user may not be limited to one type. As described above, the card reader 110 can be easily connected with the image forming apparatus 10 by a USB or the like. Therefore, a plurality of card readers 110 for different types of the card may be simultaneously connected with the image forming apparatus 10. In this case, cards 500 of a plurality of types are simultaneously used.

The image forming apparatus 10 may not be a multifunction peripheral. Within the first embodiment, it is sufficient that the image forming apparatus 10 has a function of reading an image, a communication function, or the like.

Figure 3:
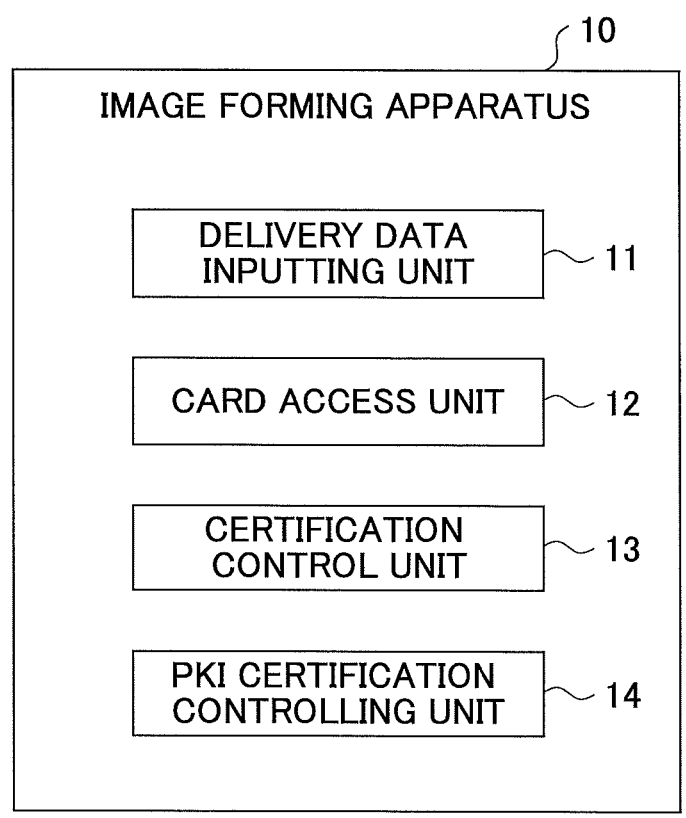
FIG. 3 illustrates an exemplary structure of functions of the image forming apparatus of the first embodiment.

FIG. 3 illustrates an exemplary structure of functions of the image forming apparatus 10 of the first embodiment. Referring to FIG. 3, the image forming apparatus 10 includes a delivery data inputting unit 11, a card access unit 12, a certification control unit 13, a PKI certification control unit 14, and so on. These units are substantialized when one or more programs installed in the image forming apparatus 10 are executed by the CPU 101.

The delivery data inputting unit 11 controls reading of image data to be delivered, transferring of the image data to the delivery server 20, or the like. For example, one application program may cause the image forming apparatus 10 to function as the delivery data inputting unit 11 for a user.

The card access unit 12 is provided to access the card 500 through the card reader 110. The certification control unit 13 controls a certification process for the user of the image forming apparatus 10. The PKI certification control unit 14 controls a process specialized for PKI certification using a user certificate stored in the card 500 in the certification process controlled by the certification control unit 13.

Subsequently, data stored in the card 500 or the certification server 30 in the initial state are described. The initial state is before a process (described below) illustrated in FIG. 5 or the like is started.

FIG. 4 explains data stored in the card 500 or the certification server 300 in the initial state.

Referring to FIG. 4, the user certificate and the user secret key are stored in the card 500 in the initial state. The user secret key belongs to each user. The user secret key corresponds to a public key recorded in the user certificate. The user secret key and the corresponding public key are paired keys.

The certification server 30 stores the user certificates, a certification server key, a delivery server key, a folder server key, or the like. Each user certificate is stored in association with the corresponding user name. The certification server key is an encryption key unique to the certification server 30. Only the certification server 30 owns the certification server key. The delivery server key is an encryption key unique to the delivery server 20. The delivery server 20 and the certification server 30 own the delivery server key. The folder server key is an encryption key unique to the folder server 50. The folder server key is owned by the folder server 50 and the certification server 30. Said differently, the certification server 30, the delivery server 20, and the folder server 50 own an encryption key unique to the certification server 30, the delivery server 20, and the folder server 50 themselves, respectively. The certification server 30 owns the encryption keys unique to the other servers, respectively. Here, the expression of "own" is to store in a memory device.

Figure 5:
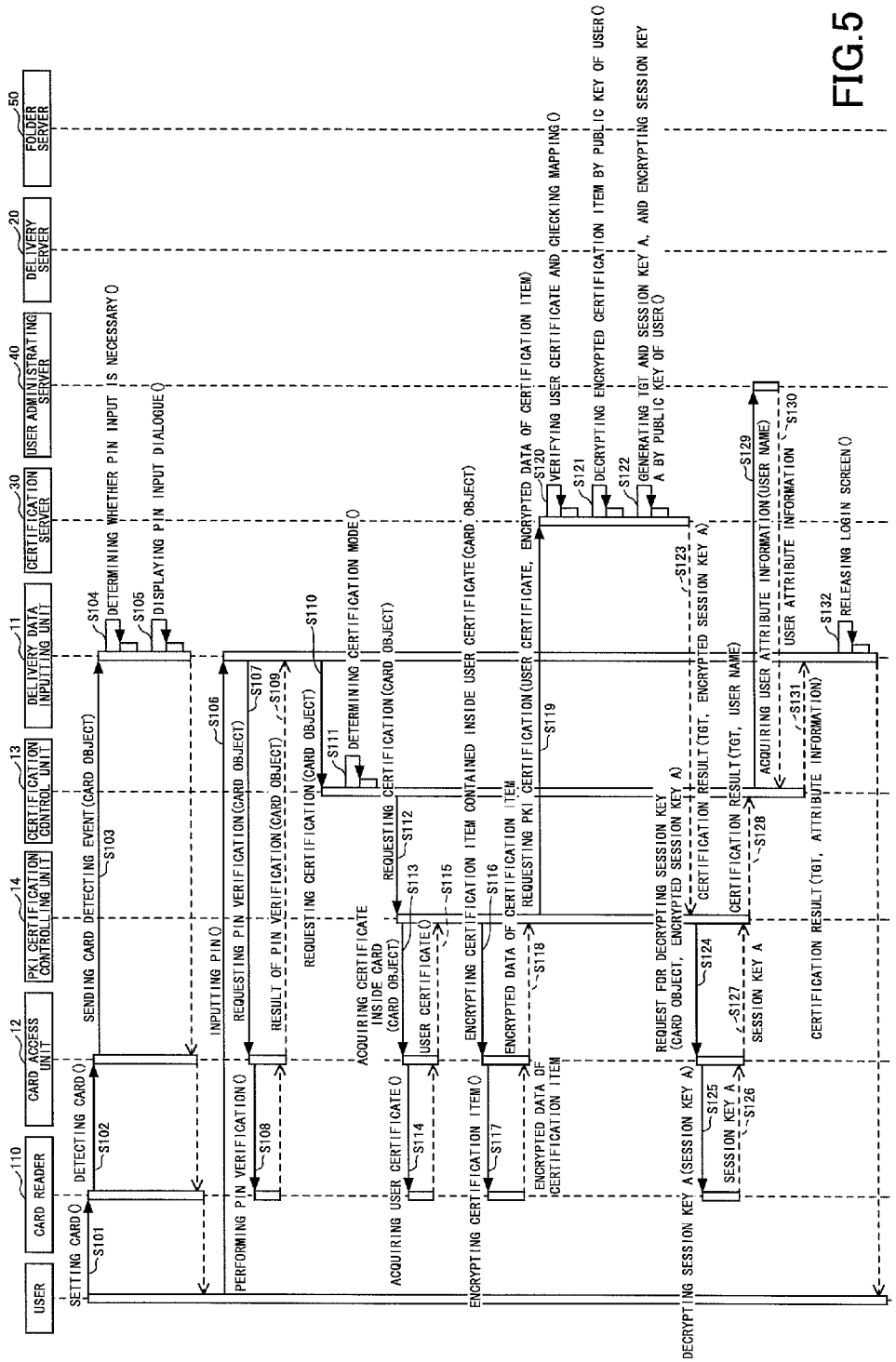
FIG. 5 is a sequence chart for illustrating exemplary processes performed in a delivery system of the first embodiment.
Figure 6:
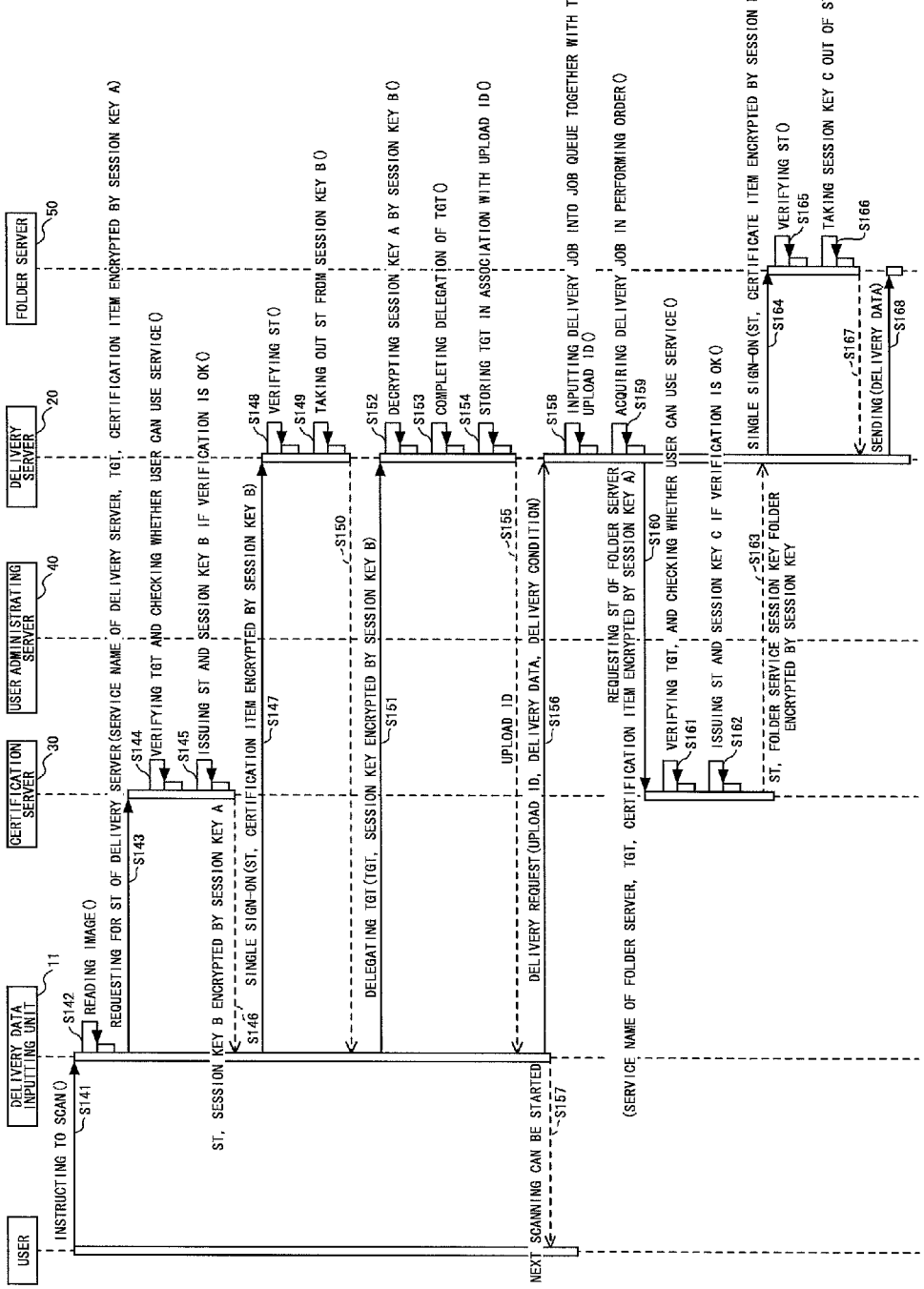
FIG. 6 is a sequence chart for illustrating exemplary processes performed in the delivery system of the first embodiment.

Hereinafter, a process performed in the delivery system 1 of the first embodiment is described. FIGS. 5 and 6 are sequence charts for illustrating exemplary processes performed in the delivery system of the first embodiment.

In step S101, the card 500 is set in the card reader 110. In step S102, the card access unit 12 detects that the card 500 is set in the card reader 110. The set-in of the card 500 in the card reader 110 includes inserting the card into the card reader 110 and moving the card 500 closer to the card reader 110 in order to make the card reader 110 read information recorded in the card 500.

Subsequently, the card access unit 12 reports that the card 500 is set in the card reader 110 to the delivery data inputting unit 11. A card object for operating the card 500 is attached to the report.

Subsequently, the delivery data inputting unit 11 determines whether personal identification number (PIN) is required to be input for the card 500 in step S104. The delivery data inputting unit 11 determines whether personal identification number (PIN) is required to be input for the card 500 by referring to, for example, card information included in the card object. Within the first embodiment, the card 500 is a smart card, which requires a PIN to be input. Therefore, the delivery data inputting unit 11 determines that the PIN is required to be input.

When the delivery data inputting unit 11 determines that the PIN is required to be input, the delivery data inputting unit 11 causes a screen for inputting the PIN on the displaying unit 108 in step S105.

Subsequently, the user inputs the PIN through the screen in step S106. Then, the delivery data inputting unit 11 designates the PIN along with the card object and requests the card access unit 12 to perform PIN verification in step S107.

The card access unit 12 requests the card 500 to perform the PIN verification for the card 500 corresponding to the card object through the card reader 110 in step S108. As a result, the PIN is inputted in the card 500. The card 500 checks off the PIN stored inside the card 500 with the input PIN. If the stored PIN matches the input PIN, locked information (information protection) in the card 500 is released. By releasing the locked information, information inside the card 500 becomes accessible. The card access unit 12 reports a result of the PIN verification (for example, whether the PIN verification is successful) to the delivery data inputting unit 11 in step S109. The report includes the card object corresponding to a state where the locked information is released.

In a case where the PIN verification is successful, the delivery data inputting unit 11 designates the card object and requests certification to the certification control unit 13 in step S110.

In response to the report, the certification control unit 13 determines a certification mode in step S111. The certification mode is determined whether the PKI certification is performed or the password certification in a second embodiment is performed. The certification mode is determined based on a state of a memory content in the auxiliary memory device 103. Specifically, in a case where a program module causing the image forming apparatus 10 to function as the PKI certification control unit 14 is stored (installed) in the auxiliary memory device 103, the certification mode may determine that the certification mode is the PKI certification. For example, in a case where a value indicative of the PKI certification is stored as a value of a setup item (a parameter) indicative of a certification mode, the certification mode may be determined as the PKI certification.

In a case where the certification mode is PKI certification, the delivery data inputting unit 11 designates the card object and requests the PKI certification control unit 14 to perform the certification process in step S112. In response to the process, the PKI certification control unit 14 designates the card object and requests the card access unit 12 to acquire the user certificate from the card 500 in step S113. In response to the request, the card access unit 12 requests the card 500 to send the user certificate for the card 500 corresponding to the card object through the card reader 110 in step S114. The card 500 whose locked information is released outputs the user certificate stored in the card 500 itself. The card access unit 12 returns the output user certificate to the PKI certification control unit 14 in step S115.

Subsequently, the PKI certification control unit 14 designates the card object and requests the card access unit 12 to encrypt certification item (e.g., the user name) recorded in the user certificate in step S116. In response to the request, the card access unit 12 requests the card 500 to encrypt the certification item through the card reader 110 in step S117. The card 500 encrypts the certification item recorded in the user certificate stored in the card itself using the user secret key stored in the card itself. The card 500 outputs the encrypted data of the certification item.

The card access unit 12 returns the encrypted data of the output certification item to the PKI certification control unit 14 in step S118. Subsequently, the PKI certification control unit 14 designates the user certificate and the encrypted data of the certification item and sends a request for performing the PKI certification to the certification server 30 in step S119.

In response to the request, the certification server 30 verifies authenticity of the received user certificate and confirms whether the user certificate corresponds to the user in step S120. A method of verifying the user certificate is similar to an ordinary method of verifying authenticity of public key certificates. The certification server 30 takes out the user name from the received user certificate to know whether the user certificate corresponds to the user. The certification server 30 acquires the user certificate stored in association with the user name in the certification server 30. If the acquired user certificate matches the received user certificate, it is confirmed that the received user certificate corresponds to the user.

Subsequently, the certification server 30 decrypts the encrypted data of the certification item using the public key recorded in the user certificate and checks the authenticity of a transmission source of the user certificate in step S121. Specifically, the decrypted certification item is compared with the certification item of the plain text included in the user certificate. If the decrypted certification item matches the certification item of the plain text, the transmission source of the user certificate is confirmed to be an owner of the user certificate.

If unauthorized conduct is not detected in steps S120 and S121, the user corresponding to the user certificate is authorized. If the user is certified, the certification server 30 generates a ticket granting ticket (TGT) and a session key of the TGT (hereinafter referred to as a "session key A" in order to distinguish from a session key described below). The session key A is encrypted by a public key recorded in the user certificate in step S122. Further, the TGT is encrypted by the certification server key. The TGT is a terminology of Kerberos being an example of proof data indicative of certification of the user. For example, the TGT is used to accept an issuance of a service ticket for each service. Further, the session key A is used as an encryption key or the like for securing security of communications between the image forming apparatus 10 and the certification server 30.

Subsequently, the certification server 30 returns the encrypted TGT and the encrypted session key A to the PKI certificate control unit 14 as the certification result in step S123. As a result, the PKI certification control unit 14 acquires the encrypted TGT and the encrypted session key A.

In a case where the user is not certified, the TGT and the session key are not returned to the image forming apparatus 10.

Exchanges between the image forming apparatus 10 (the PKI certification control unit 14) and the certification server 30 in steps S119 to S123 are described with reference to figures.

Figure 7:
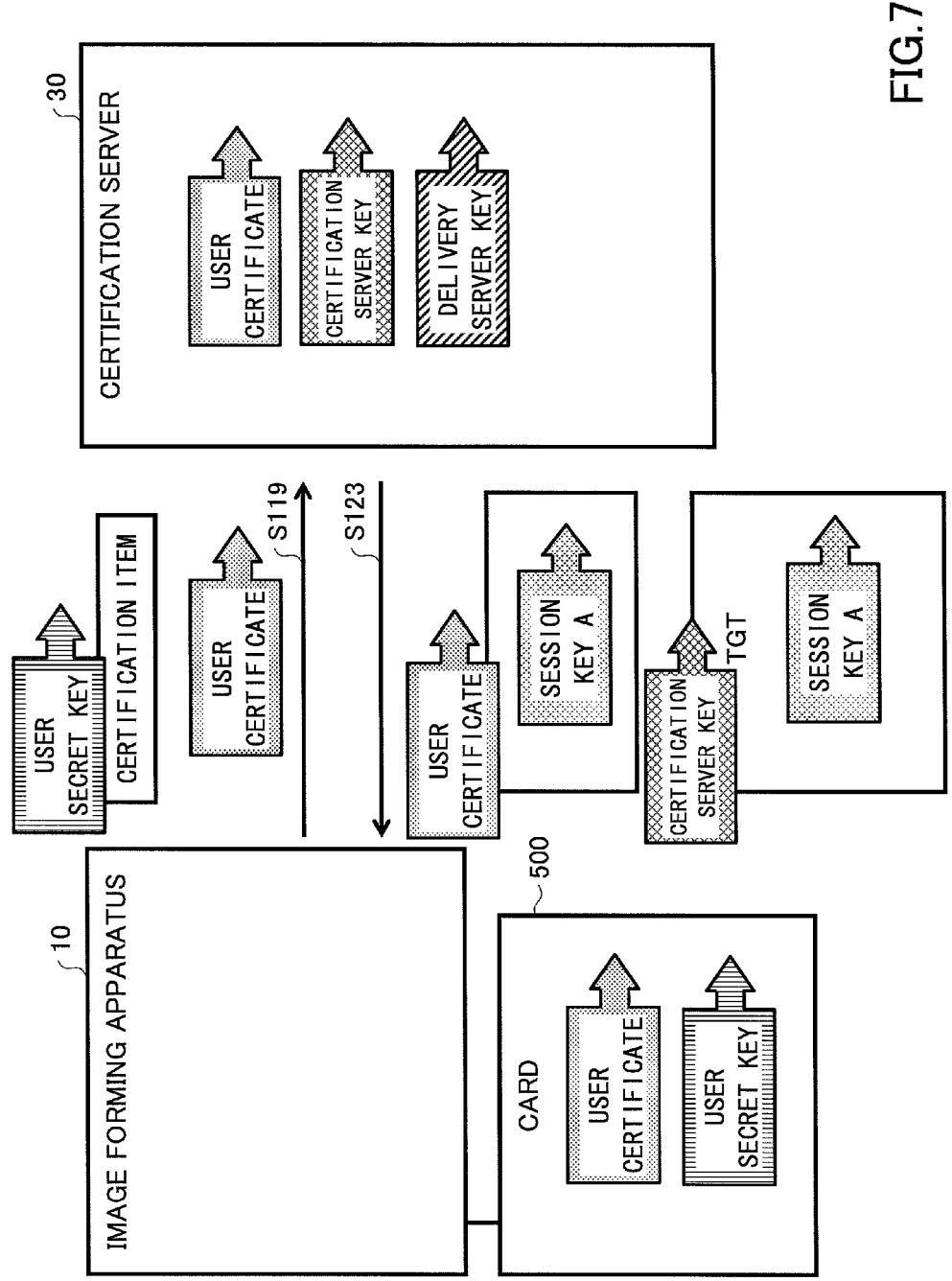
FIG. 7 illustrates processes related to issuance of TGT in PKI certification.

FIG. 7 illustrates processes related to issuance of the TGT in the PKI certification. Step numbers associated with arrows correspond to the step numbers in FIG. 5.

In step S119, the user certificate taken out of the card 500 and the encrypted data of the user certification item encrypted by the user secret key which is stored in the card 500 are sent to the certification server 30 from the image forming apparatus 10. The certification server 30 receiving the data performs the processes described in steps S120 to S122.

In step S123, the session key A encrypted by the public key recorded in the user certificate and the TGT encrypted by the certification server key are returned to the image forming apparatus 10. The session key A is recorded in the TGT.

Referring to FIG. 7, marks of encryption keys such as the user secret key, the user certificate, and the certification server key overlap rectangles at left upper corners of the rectangles. In these cases, data corresponding to the rectangles are encrypted by these encryption keys. For example, referring to FIG. 7, the user certification item, the session key A, and the TGT are data encrypted by the encryption keys of the user secret key, the user certificate, and the certification server key, respectively. Similarly, rectangles and marks of encryption keys are used in the following figures.

In or after FIG. 7, the folder server key is omitted from illustration for convenience.

Subsequently, the PKI certification control unit 14 designates the card object and the encrypted session key A and requests decryption of the session key A to the card access unit 12 in step S124. In response to the request, the card access unit 12 requests the card 500 to decrypt the session key A to the card 500 corresponding to the card object through the card reader 110 in step S125. The card 500 decrypts the session key A by the user secret key stored in the card itself. The card 500 outputs the decrypted session key A in step S126. The card access unit 12 returns the output session key A to the PKI certification control unit 14 in step S127.

The encrypted TGT is not decrypted. Only the certification server can refer to the content of the TGT. Hereinafter, if "TGT" is simply mentioned, "TGT" refers to a TGT encrypted by the certification server key.

Subsequently the PKI certification control unit 14 returns the certification result including the TGT and the user name to the certification control unit 13 in step S128. However, if the certification is failed, information indicative of failure of the certification is returned to the certification control unit 13. The user name can be acquired from the user certificate.

If the certification is successful and the TGT and the user name are returned, the certification control unit 13 designates the user name and returns a request for acquiring the attribute information of the user to the user administrating server 40 in step S129. The user administrating server 40 returns the attribute information stored in association with the designated user name in step S130. For example, the attribute information includes the folder name of the delivery destination of the image data.

Subsequently, the certification control unit 13 returns a certification result including the TGT and the attribute information of the user to the delivery data inputting unit in step S131. However, if the certification is failed, information indicative of the failure of the certification is returned to the delivery data inputting unit 11.

If the certification is successful and the TGT and the user attribute information are returned, the delivery data inputting unit releases the login screen in step S132. The release of the login screen means that the login screen is vanished and an operation screen corresponding to the delivery data inputting unit 11 can be operated.

Subsequently, when an original is set in the image forming apparatus 10 and an instruction of performing scanning is input by a user through the operation screen in step S141 of FIG. 6, the delivery data inputting unit 11 causes the image reading unit 106 to read out image data from the set original in step S142.

Subsequently, the process for delegating the TGT to the delivery server 20 is performed. The delegation of the TGT means giving use authority of the TGT. Basically, the TGT can be used only by a party that acquires the TGT. Within the first embodiment, the party that acquires the TGT is the image forming apparatus 10. Therefore, only the image forming apparatus 10 can use the TGT. However, by delegating the TGT, the party on a delegation destination that receives the TGT can user the TGT. For delegating the TGT, the following processes are is used.

In step S143, the delivery data inputting unit 11 sends a request for acquiring the service ticket to the delivery server 20 on the delegation destination of the TGT to delegate the TGT. In the acquisition request, the service name (i.e., an identification name) of the delivery server 20, the TGT, and the certification item encrypted by the session key A are designated. The certification item is the same as the above certification item. The certification item is also the same in the following.

The certification server 30 verifies the TGT designated by the request for acquiring the TGT, and confirms whether a user (an operator of the image forming apparatus at the present time) related to the TGT has use authority of the service related to the service name designated in the request for acquiring the TGT in step S144. The method of verifying the TGT may be similar to ordinary implementation of Kerberos certification. In a case where the verification of the TGT is successful and it is confirmed that the user has the use authority of the service, the certification server 30 generates the service ticket (hereinafter, "service ticket B") for enjoying the service provided by the delivery server 20 and a session key (hereinafter, "session key B") for communicating with the delivery server 20 in step S145. Said differently, session keys mutually different for each communication destination are required.

Subsequently, the certification server 30 returns the generated service ticket B and the generated session key B to the delivery data inputting unit 11 in step S146. The session key B is encrypted by the session key A and the encrypted session key B is returned. Further, the service ticket B is encrypted by the delivery server key, and the encrypted service ticket is returned. Said differently, the service ticket is encrypted by a server key of the corresponding server. Therefore, only the corresponding server and the certification server 30 can refer to the content of the service ticket.

Exchanges between the image forming apparatus 10 (the delivery data inputting unit 11) and the certification server 30 in steps S143 to S146 are described with reference to figures.

Figure 8:
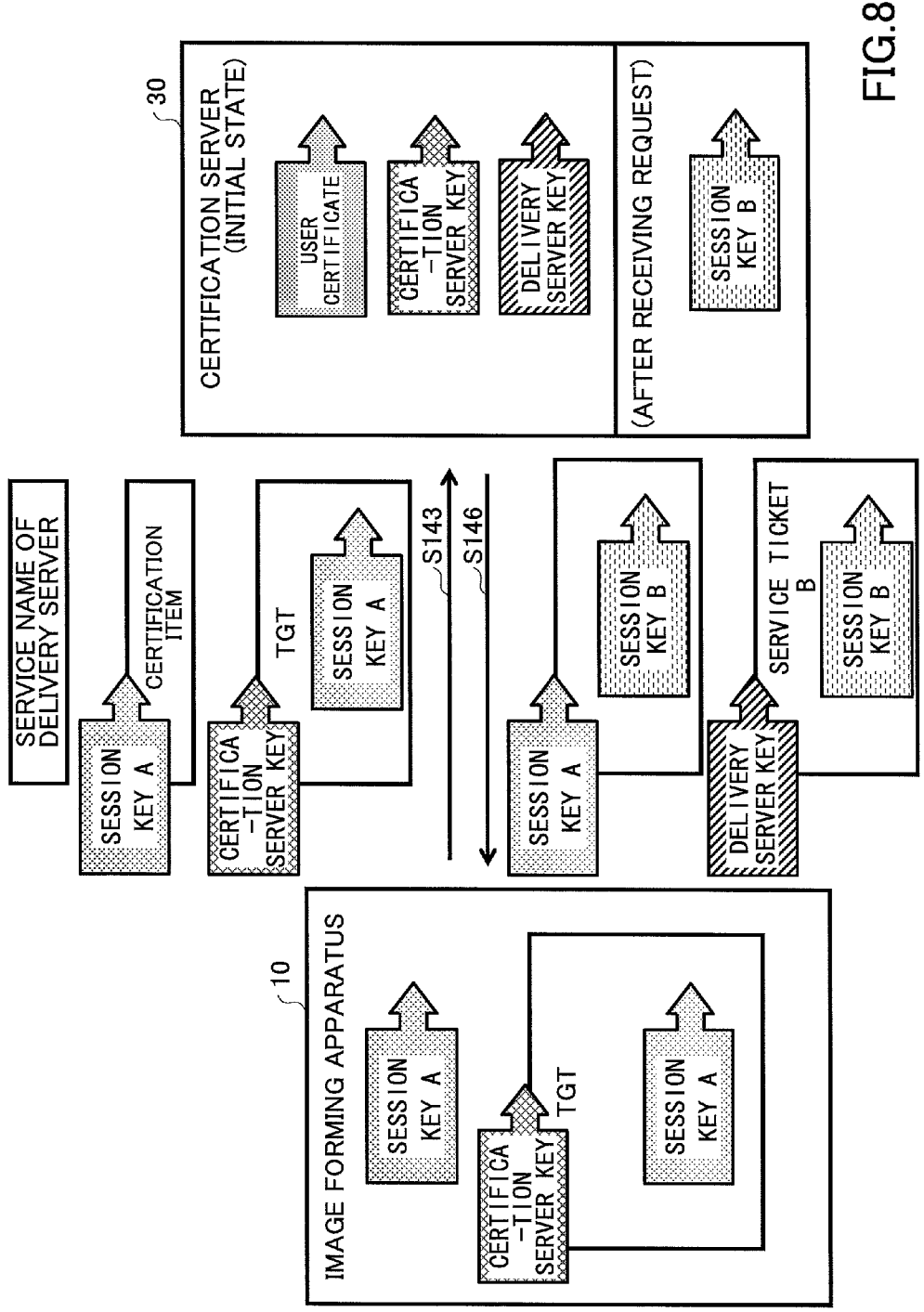
FIG. 8 illustrates processes related to issuance of a service ticket in a delivery server.

FIG. 8 illustrates processes related to issuance of a service ticket in the delivery server 20. The initial state in FIG. 8 is before step S143.

In the initial state, the image forming apparatus 10 includes the session key A and the TGT. As illustrated in FIG. 7, the session key A and the TGT are received in step S123.

In step S143, the service name of the delivery server 20, the certification item encrypted by the session key A, and the TGT are sent from the image forming apparatus to the certification server 30. The certification server 30 receiving the data performs the processes described in steps S144 and S145. Resultantly, the certification server 30 further owns the session key B.

In step S143, the session key B encrypted by the session key A and the service ticket B encrypted by the delivery server key are returned to the image forming apparatus 10. The session key B is recorded in the service ticket B.

The delivery data inputting unit 11 of the image forming apparatus 10 can acquire the session key B of a plain text by decoding the encrypted data of the received session key B using the session key A.

Subsequently, the delivery data inputting unit 11 designates the service ticket B encrypted by the delivery server key, the certification item encrypted by the session key B, or the like, and sends a request for single sign-on (a request for login) to the delivery server 20 in step S147.

The delivery server 20 verifies the designated service ticket B in response to the request for the single sign-on in step S148. The method of verifying the service ticket may be similar to the ordinary implementation of Kerberos certification. For example, the delivery server 20 decrypts the encrypted service ticket B using the delivery server key owned by the delivery server 20 itself. The delivery server 20 takes out the session key B and the certification item from the decrypted service ticket B. The delivery server 20 decrypts the received certification item by the taken out session key B. The delivery server 20 compares the decrypted certification item with the certification item taken out of the service ticket to thereby verify whether the decrypted certification item and the taken out certification item match.

In a case where the verification of the service ticket B is successful, the delivery server 20 takes out the session key B from the service ticket and holds in step S149. Resultantly, the session key B is shared between the image forming apparatus 10 and the delivery server 20. Subsequently, the delivery server 20 returns a response indicative of the success of the single sign-on to the delivery data inputting unit 11 in step S150. However, in a case where the verification of the service ticket B fails, a response indicative of the failure of the single sign-on is returned.

Exchanges between the image forming apparatus 10 (the delivery data inputting unit 11) and the certification server 30 in steps S147 to S149 are described with reference to figures.

Figure 9:
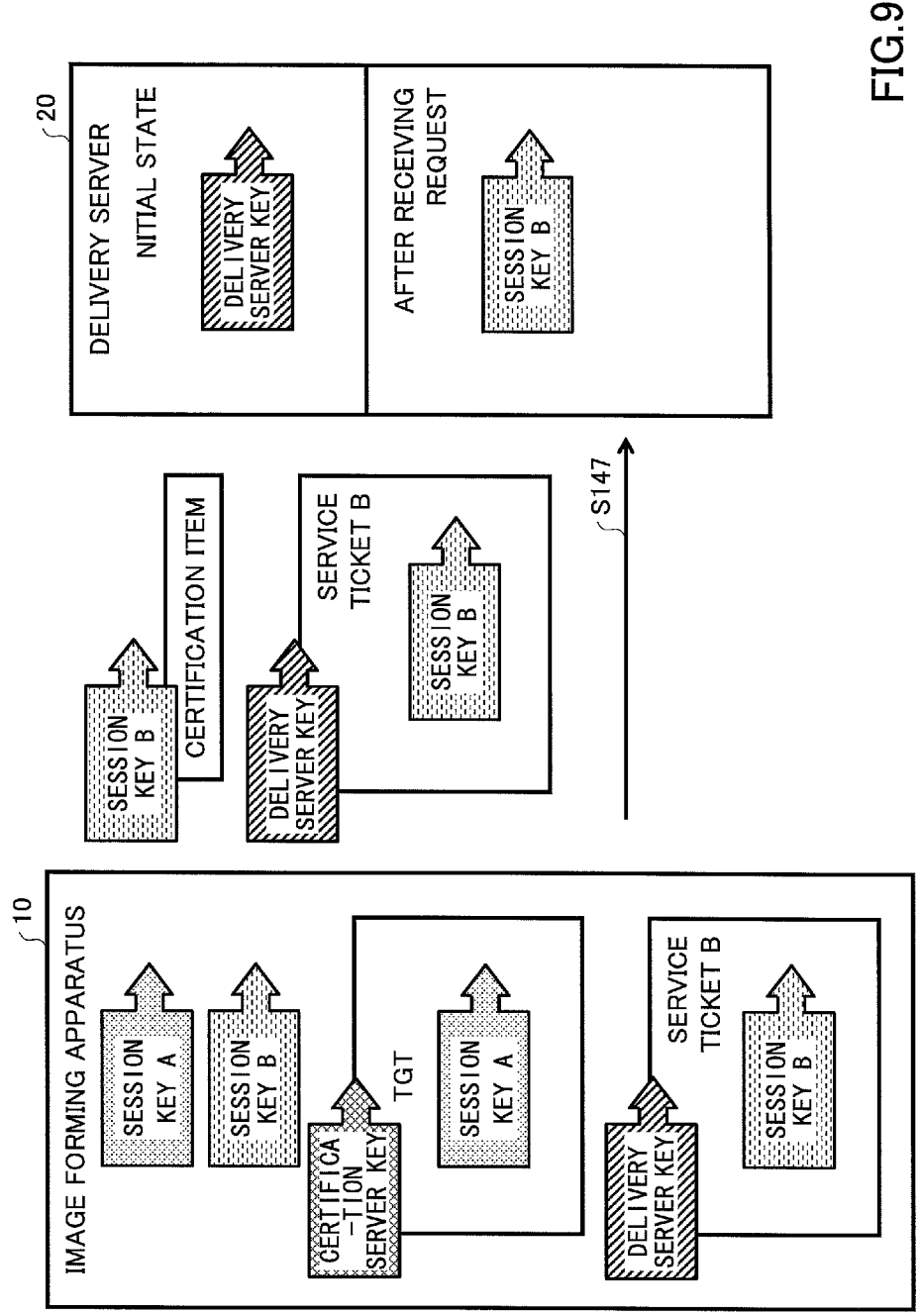
FIG. 9 illustrates processes for sharing a session key between the image forming apparatus and the delivery server.

FIG. 9 illustrates processes for sharing a session key between the image forming apparatus 10 and the delivery server 20. The initial state in FIG. 9 is before step S147.

In the initial state, the image forming apparatus 10 has the session key B, the service ticket B encrypted by the delivery server key in addition to the session key A and the TGT. The session key B and the service ticket encrypted by the delivery server key are received in step S146 as illustrated in FIG. 8.

On the other hand, the delivery server 20 has the delivery server key in the initial state.

In step S147, the certification item encrypted by the session key B and the service ticket encrypted by the delivery server key are sent from the image forming apparatus 10 to the delivery server 20. The certification server 20 receiving these data performs the processes described in steps S148 and S149. Resultantly, the delivery server 20 further owns the session key B.

Subsequently, the delivery data inputting unit 11 delegates the TGT and the session key A encrypted by the session key B to the delivery server 20. Thus, the TGT is transferred to the delivery server 20 in step S151. The delivery server 20 receiving these data decrypts the session key A using the session key B owned by the delivery server 20 itself in step S152. With this, the delivery server 20 acquires the session key A used for communicating with the certification server 30. By acquiring both the TGT and the session key A, the delegation of the TGT to the delivery server 20 is completed in step S153. As described later, the delivery server 20 uses the delegated TGT to acquire the access authority to a folder in the folder server 50.

Subsequently, the delivery server 20 newly generates an upload ID and stores the TGT in association with the upload ID. The upload ID is identification information for identifying a delivery request for the delivery server 20. Subsequently, the delivery server 20 returns the upload ID to the delivery data inputting unit 11 in step S155.

Exchanges between the image forming apparatus 10 (the delivery data inputting unit 11) and the certification server 30 in steps S151 to S153 are described with reference to figures.

Figure 10:
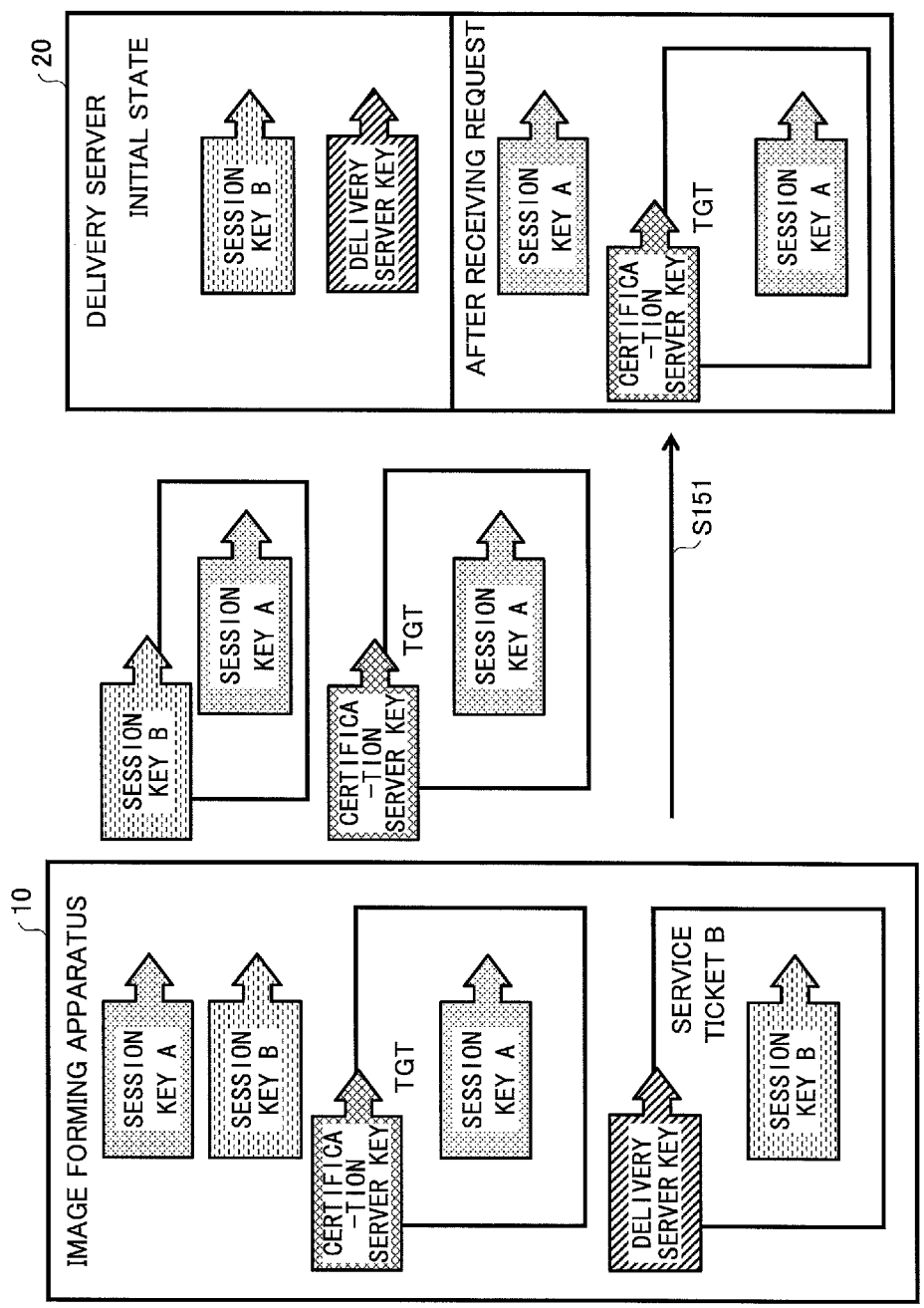
FIG. 10 illustrates processes for delegating TGT.

FIG. 10 illustrates processes for delegating TGT. The initial state in FIG. 10 is before step S151.

Referring to FIG. 10, the initial state of the image forming apparatus 10 is the same as the initial state illustrated in FIG. 9. On the other hand, the delivery server 20 has the session key B in addition to the delivery server key in the initial state. The session key B is acquired from the service ticket B received in step S147 of FIG. 9.

In step S151, the session key A encrypted by the session key B and the TGT are transferred from the image forming apparatus 10 to the delivery server 20. The delivery server 20 receiving these data performs the processes described in steps S152 and S153. Resultantly, the delivery server 20 further owns the session key A and the TGT.

The state of the delivery server 20 at this time is the same as the initial state of the image forming apparatus 10 in FIG. 8. In the state of the delivery server 20, both of the session key A and the TGT are owned by the delivery server 20. Therefore, the delivery server 20 can request the certification server 30 to issue the service ticket even though the delivery server itself is not the party which acquires the TGT from the certification server 30.

After the TGT is completely transferred, the delivery data inputting unit 11 sends a request for delivering data while designating the upload ID, the image data (hereinafter, "delivery data") read in step S142, a delivery condition or the like in step S156. The delivery condition is information including identification information (identification information of the folder server 50 and of the folder) of the delivery destination, or the like. The delivery condition may be input by a user at a time of reading the image data or included in user attribute information. Subsequently, the delivery data inputting unit 11 enables operating an operation screen in step S157. Said differently, it is enabled to receive an instruction of performing next scanning.

On the other hand, the delivery server 20 receiving the request for delivering the data throws a delivery job including the delivery data and the delivery condition to the job queue along with the TGT corresponding to the received upload ID in step S158.

Subsequently, the delivery server 20 acquires the delivery job to be processes in order of processing the delivery jobs out of the job queue in step S159. Subsequently, the delivery server 20 sends the request for acquiring the service ticket (hereinafter, referred to as "service ticket C") used for the folder server 50 to the certification server 30 in step S160. The service name of the folder server 50, the delegated TGT, and the certification item encrypted by the session key A are designated in the request for acquiring the service ticket C.

The certification server 30 performs the processes similar to the above steps S144 and S145 in steps S161 and S162. However, the service ticket C and a session key (hereinafter, "session key C") for communication with the folder server 50 are generated in step S162. Subsequently, the certification server 30 returns the generated service ticket C and the generated session key C to the delivery server 20 in step S163. Further, the service ticket C is encrypted by the folder server key, and the encrypted service ticket C is returned. Further, the service ticket C is encrypted by the session key A, and the encrypted service ticket C is returned. The service ticket C includes the session key C.

Exchanges between the delivery server 20 and the certification server 30 in steps S160 to S163 are similar to those illustrated in FIG. 8 in principle.

Subsequently, the delivery server 20 sends a request for single sign-on (a request for login) to the folder server 50 while designating the service ticket C encrypted by the folder server key, the certification item encrypted by the session key, or the like in step S164. The folder server 50 responds to the request for single sign-on and performs processes similar to the processes performed by the delivery server 20 in steps S148 to S150 in steps S165 to S167. However, the service ticket C is verified in step S146. In step S166, the session key C is taken out of the service ticket C. Resultantly, the session key C is shared between the delivery server 20 and the folder server 50.

Exchanges between the delivery server 20 and the certification server 30 in steps S164 to S166 are similar to those illustrated in FIG. 9 in principle.

If the single sign-on into the folder server 50 is successful, the delivery server 20 acquires access authority to the folder server 50. The delivery server 20 sends the delivery data to the folder server 50 in step S168. At this time, the folder of the transmission destination and so on complies with the delivery condition.

As described, within the first embodiment, the single sign-on is realized without managing the user name and the password. Said differently, after the user once sets the card 500, it is not requested to input the user name, the password, information related to the user name and the password, or the like.

Such an effect is easily obtainable mainly when the TGT acquired by the image forming apparatus 10 is delegated to the delivery server 20. In a case where the TGT is not delegated, it is possible that the image forming apparatus 10 transfers the user certificate and the certification item encrypted by the user secret key to the delivery server 20, and the delivery server 20 newly acquires the TGT based on the user certificate and the certification item. However, in this case, in order for the delivery server 20 to use the acquired TGT, it is necessary for the delivery server 20 to collaborate with the card 500 set in the image forming apparatus 10. Referring to FIG. 7, the session key A encrypted by the public key is required to be decrypted in order to acquire the session key A of the plain text. Therefore, complicated exchanges become necessary between the image forming apparatus 10 and the delivery server 20.

Within the first embodiment, since the TGT is delegated to the delivery server 20, the delivery server 20 can acquire access authority to the folder server 50 based on the TGT without undergoing the complicated exchanges.

Next, a second embodiment is described. Differences of the second embodiment from the first embodiment are described. Features of the second embodiment, which are not specifically described, are substantially the same as those of the first embodiment.

Within the second embodiment, the card 500 is not limited to the smart card and may be any such as a magnetic card or the like as long as a unique card ID (a unique card number) is recordable in each card. The card ID is ordinarily referred to as a universal ID or a card serial number.

Within the second embodiment, the PKI certification is not performed. Instead, certification based on a user name related to the card ID recorded in the card 500 and a password (hereinafter, referred to as a "password certification. This means that the state of the auxiliary memory device 103 corresponds to the password certification. Specifically, a program module causing the image forming apparatus 10 to function as the PKI certification control unit 14 is not stored in the auxiliary memory device 103, or a value indicative of the password certification is stored as a value of the setup item indicative of the certification mode.

Figure 11:
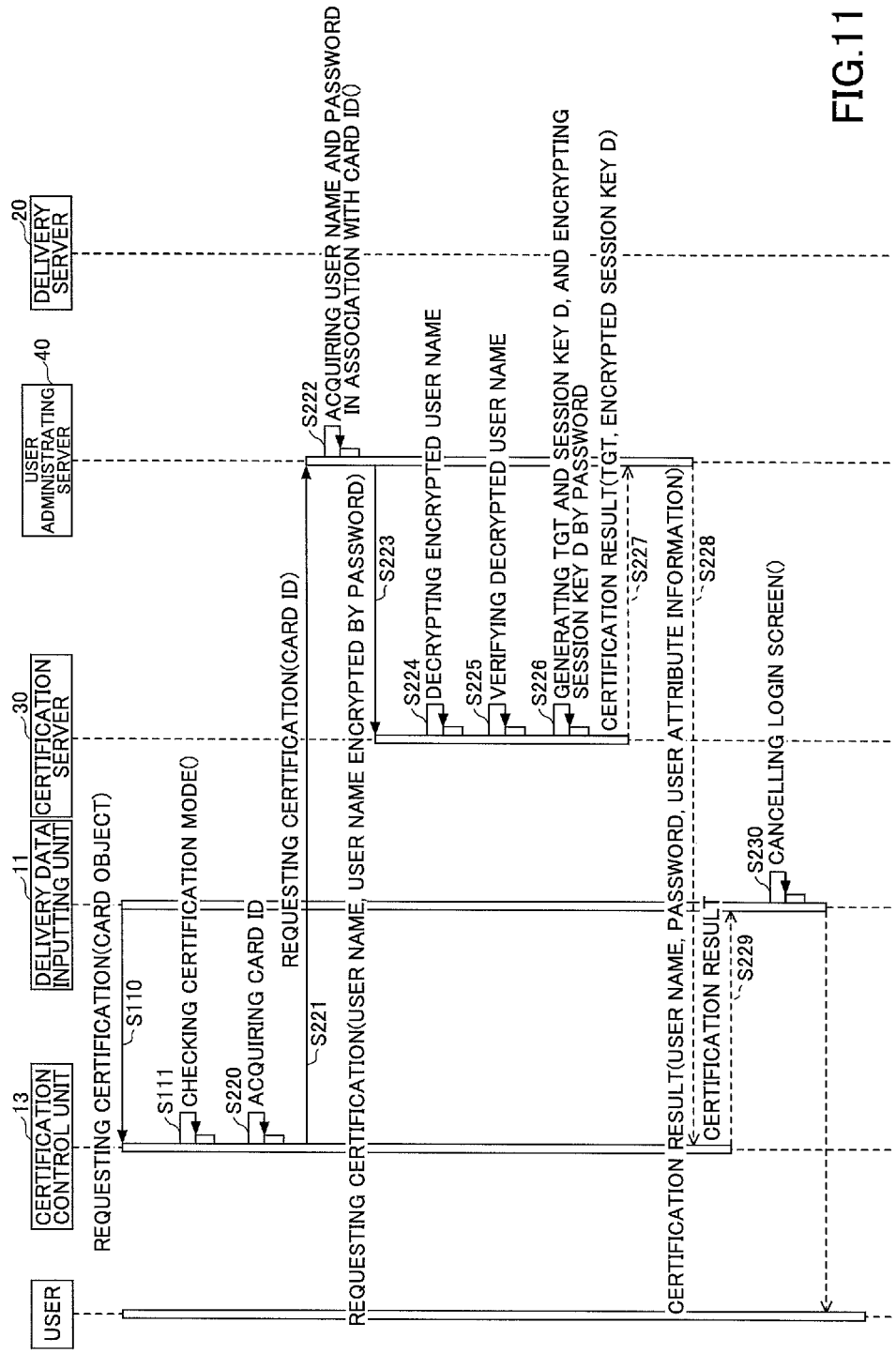
FIG. 11 is a sequence chart for illustrating exemplary processes performed in a delivery system of a second embodiment.
Figure 12:
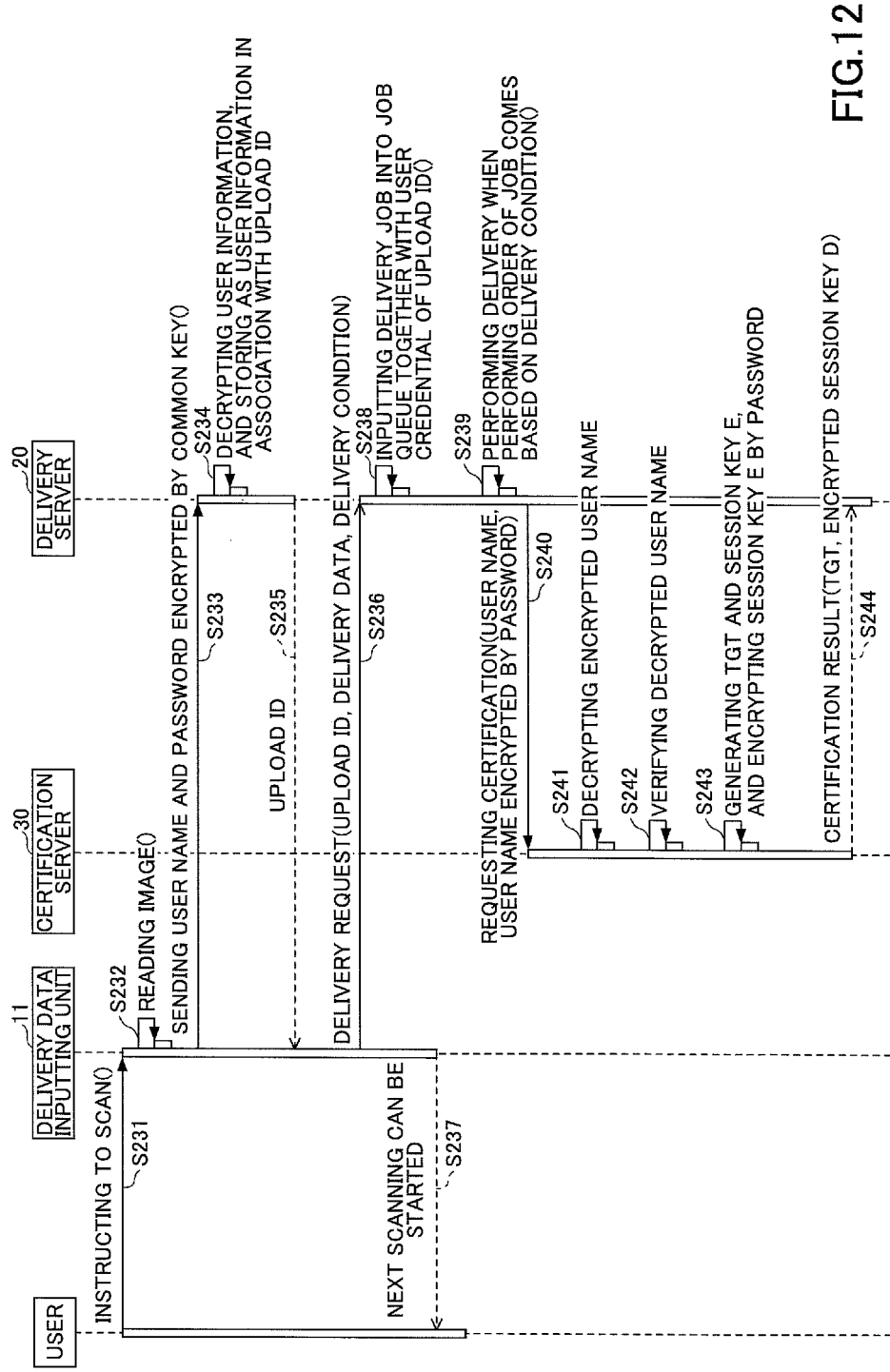
FIG. 12 is a sequence chart for illustrating exemplary processes performed in the delivery system of the second embodiment.

FIGS. 11 and 12 are sequence charts for illustrating exemplary processes performed in the delivery system of the second embodiment. Referring to FIG. 11, steps S101 to S109 in FIG. 5 are omitted for convenience. In a case where the card 500 requires an input of a PIN, steps S101 to S109 are performed. In a case where the card 500 does not require the input of the PIN, after step S104, the process goes to step S110.

The contents of the processes in steps S110 and S111 are similar to the steps having the same numbers. Within the second embodiment, it is determined in step S111 that the certification mode is the password certification. The certification control unit 13 acquires the card ID form the card 500 through the card access unit 12 and the card reader 110 in step S220. Subsequently, the certification control unit 13 designates the card ID and sends a request for performing the certification to the user administrating server 40 in step S221.

The user administrating server 40 acquires the user name and the password, which are associated with the card ID designated by the request in step S222. Subsequently, the user administrating server 40 sends a certification request for certificating while designating the user name and the encrypted data of the encrypted certification item in step S223. The user name is used as the certification item.

In response to the certification request, the certification server 30 decrypts the encrypted data of the received user name using the password previously stored in association with the received user name in step S224. Within the second embodiment, the certification server 30 previously stores the user name and the password for each user. Subsequently, the certification server 30 verifies the decrypted user name by comparing the decrypted user name and the received user name in step S225. When if the decrypted user name and the received user name match, the certification server 30 determines that the user has been successfully certificated. In a case where the certification of the user is successful, the certification server 30 generates the TGT for the user and the session key (hereinafter, referred to as a "session key D") of the TGT in step S226. The certification server 30 returns the generated TGT and the session key D to the user administration server 40 in step S227. The TGT is encrypted by the certification key and returned. The session key D is encrypted by the password of the user and returned.

Exchanges between the user administration server 40 and the certification server 30 in steps S223 to S227 are explained with reference to figures.

Figure 13:
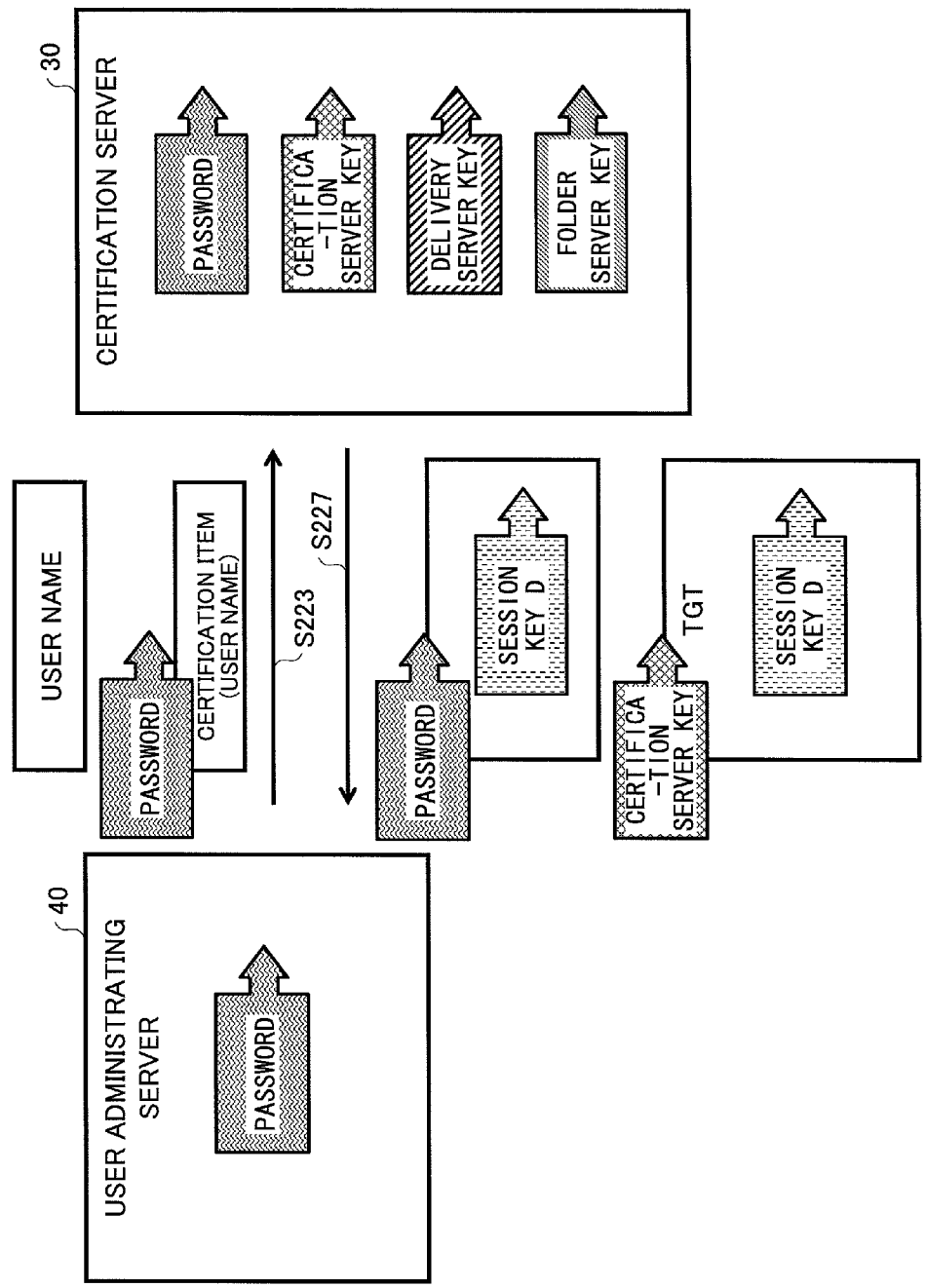
FIG. 13 illustrates processes related to issuance of TGT in password certification.

FIG. 13 illustrates processes related to issuance of the TGT in the password certification. The initial state in FIG. 13 is before step S223. The state of the certification server 30 in the initial state is substantially similar to the state of the certification server in the initial state illustrated in FIG. 7. However, in a case of the password certification, the certification server 30 stores the password in association with the user names.

In step S223, the user name and the encrypted data of the encrypted certification item (the user name) are sent from the user administrating server 40 to the certification server 30. The certification server 30 receiving the data performs the processes described in steps S224 to S226.

In step S227, the session key D encrypted by the password and the TGT encrypted by the certification server key are returned to the user administrating server 40. The session key D is recorded in the TGT. Hereinafter, "TGT" refers to a TGT encrypted by the certification server key.

In a case where the certification is successful, the user administrating server 40 returns the user name and the password as the result of the certification result, attribute information of the user stored in association with the user name, or the like to the certification control unit 13 in step S228. The certification control unit 13 returns the certification result to the delivery data inputting unit 11 in step S229.

Subsequently, the delivery data inputting unit 11 releases the login screen in step S230. Subsequently, when an original is set in the image forming apparatus 10 and an instruction of performing scanning is input by the user through the operation screen in step S231 of FIG. 12, the delivery data inputting unit 11 causes the image reading unit 106 to read out image data from the set original in step S232. Subsequently, the delivery data inputting unit 11 sends the user name and the password to the delivery server 20 in step S233. Each of the user name and the password are encrypted by a common key which has been previously exchanged between the delivery server 20 and the image forming apparatus 10 and sent.

The delivery server 20 decrypts the user name and the encrypted data, which are received, by the common key, and the decrypted user name and password are stored in association with the upload ID in step S234. Subsequently, the delivery server 20 returns the upload ID to the delivery data inputting unit 11 in step S235. As described later, the delivery server 20 uses the user name and the password in order to acquire access authority to the folder server 50.

Subsequently, the delivery data inputting unit 11 sends a request for delivering data while designating the upload ID, the image data (hereinafter, "delivery data") read in step S142, a delivery condition or the like in step S236. Subsequently, the delivery data inputting unit 11 enables operating an operation screen in step S237. Said differently, it is enabled to receive an instruction of performing next scanning.

On the other hand, the delivery server 20 receiving the request for delivering the data throws a delivery job including the delivery data and the delivery condition along with the user name and the password corresponding to the received upload ID in step S238. Subsequently, the delivery server 20 acquires the delivery job to be processes in order of processing the delivery jobs out of the job queue in step S239. Subsequently, the user administrating server 20 sends the certification request to the certification server 30 while designating the user name and the encrypted data of the encrypted user name in step S240.

In response to the certification request, the certification server 30 decrypts the encrypted data of the received user name using the password previously stored in association with the received user name in step S241. Subsequently, the certification server 30 verifies the decrypted user name by comparing the decrypted user name and the received user name in step S242. When if the decrypted user name and the received user name match, the certification server 30 determines that the user has been successfully certificated. In a case where the certification of the user is successful, the certification server 30 generates the TGT for the user and the session key (hereinafter, referred to as a "session key E") of the TGT in step S243. The certification server 30 returns the generated TGT and the session key E to the delivery server 20 in step S244. The TGT is encrypted by the certification key and returned. The session key D is encrypted by the password of the user and returned.

Thereafter, the processes are similar to those on or after step S160 illustrated in FIG. 11.

As described above, according to the delivery system 1 in which the first and second embodiments are combined, the certification mode (the PKI certification or the password certification) can be automatically switched over in response to an operational environment of the user. Said differently, the certification control unit 13 determines the certification mode in step S111 and changes a control based on a result of the determination.

Therefore, for example, a correspondence among the card ID, the user name, and the password are administrated by a user administrating server 40. Thus, the system can respond to the user who wishes to use easy password certification using the card.

Within the second embodiment, the image forming apparatus 10 is an example of the image inputting apparatus. A digital camera having a communication function or the like may be used as the image inputting apparatus. Alternatively, a communication device (a portable phone, a smart phone, or the like) having a digital camera function may be used as the image inputting apparatus. In this case, capturing the image corresponds to an input of the image.

The PKI certification control unit 14 is an example of a first certification control unit. The delivery data inputting unit 11 is an example of a delegating unit, a sending unit, and a transferring unit. The certification control unit 13 is an example of a second certification control unit. The delivery server 20 is an example of an information processing apparatus. The user name is an example of user identification information.

The single sign-on is enabled under an environment where the user identification information and the password is not administrated.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the information processing system has been described in detail, it should be understood that various changes, substitutions, and alterations could be made thereto without departing from the spirit and scope of the invention.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device.

The computer software can be provided to the programmable device using any storage medium for storing processor readable code such as a floppy disk, hard disk, CD ROM, magnetic tape device or solid state memory device.

The hardware platform includes any desired hardware resources including, for example, a central processing unit (CPU), a random access memory (RAM), and a hard disk drive (HDD). The CPU may include processors of any desired kinds and numbers. The RAM may include any desired volatile or nonvolatile memories. The HDD may include any desired nonvolatile memories capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

This application is based upon and claims the benefit of priority of the prior Japanese Patent Application No. 2012-196837, filed on Sep. 7, 2012, the entire contents of which are incorporated herein by reference.

What is claimed is:

1. An information processing system including an image inputting apparatus and an information processing apparatus, wherein the image inputting apparatus comprises
    a first certification control unit that sends a certification request, in which a public key certificate read from a recording medium is designated, to a certification apparatus connected with the image inputting apparatus through a network and receives proof data, which indicates that certification is completed and is encrypted by the certification apparatus, and a first session key used for communication between the image inputting apparatus and the certification apparatus, from the certification apparatus,
    a delegating unit that receives a second session key, which is used for communication between the image inputting apparatus and the information processing apparatus and encrypted by the first session key from the certification apparatus and delegates the proof data by sending the second session key decrypted by the received first session key, the proof data, and the first session key encrypted by the decrypted second session key to the information processing apparatus, which is connected with the image inputting apparatus through the network, and
    a sending unit that sends a delivery request for delivering image data input by the image inputting apparatus to the information processing apparatus,
    wherein the information processing apparatus acquires an access right to a delivery destination of the image data from the certification apparatus using the first session key decrypted by the decrypted second session key and the proof data delegated by the delegating unit.

2. The information processing system according to claim 1, wherein the image inputting apparatus further comprises:
    a second certification control unit that acquires, in a case where a content of a storing unit of the image inputting apparatus is in a predetermined state, identification information of the recording medium from the recording medium and causes the certification apparatus to perform certification based on user identification information and a password, which corresponds to the identification information, and
    a transferring unit that transfers the user identification information and the password to the information processing apparatus,
    wherein the information processing apparatus acquires the access right to the delivery destination of the image data using the user identification information and the password, which are transferred by the transferring unit.

3. The image inputting apparatus according to claim 1.

4. The information processing apparatus according to claim 1.

5. A method of processing information performed by an image inputting apparatus and an information processing apparatus,
wherein the image inputting apparatus performs:
    sending a certification request, in which a public key certificate read from a recording medium is designated, to a certification apparatus connected with the image inputting apparatus through a network, receiving proof data, which indicates that certification is completed and is encrypted by the certification apparatus, and a first session key used for communication between the image inputting apparatus and the certification apparatus, from the certification apparatus, receiving a second session key, which is used for communication between the image inputting apparatus and the information processing apparatus and encrypted by the first session key from the certification apparatus, delegating the proof data by sending the second session key decrypted by the received first session key, the proof data, and the first session key encrypted by the decrypted second session key to the information processing apparatus, which is connected with the image inputting apparatus through the network, and sending a delivery request for delivering image data input by the image inputting apparatus to the information processing apparatus, wherein the information processing apparatus acquires an access right to a delivery destination of the image data from the certification apparatus using the first session key decrypted by the decrypted second session key and the proof data delegated by the delegating.

6. The method of processing the information according to claim 5, the method further comprising:

acquiring, in the image inputting apparatus, in a case where a content of a storing unit of the image inputting apparatus is in a predetermined state, identification information of the recording medium from the recording medium and causing the certification apparatus to perform certification based on user identification information and a password, which corresponds to the identification information, and transferring, in the image inputting apparatus, the user identification information and the password to the information processing apparatus, wherein the information processing apparatus acquires the access right to the delivery destination of the image data using the user identification information and the password, which are transferred by the transferring.

7. A non-transitory computer-readable storage medium storing a program for causing a computer installed in an image inputting apparatus to execute a method of processing information performed by the image inputting apparatus and an information processing apparatus, the method comprising:

sending, by the image inputting apparatus, a certification request, in which a public key certificate read from a recording medium is designated, to a certification apparatus connected with the image inputting apparatus through a network;

receiving proof data, which indicates that certification is completed and is encrypted by the certification apparatus, and a first session key used for communication between the image inputting apparatus and the certification apparatus, from the certification apparatus;

receiving a second session key, which is used for communication between the image inputting apparatus and the information processing apparatus and encrypted by the first session key from the certification apparatus, delegating, by the image inputting apparatus, the proof data by sending the second session key decrypted by the received first session key, the proof data, and the first session key encrypted by the decrypted second session key to the information processing apparatus, which is connected with the image inputting apparatus through the network; and sending, by the image inputting apparatus, a delivery request for delivering image data input by the image inputting apparatus to the information processing apparatus, wherein the information processing apparatus acquires an access right to a delivery destination of the image data from the certification apparatus using the first session key decrypted by the decrypted second session key and the proof data delegated by the delegating.

8. The non-transitory computer-readable storage medium according to claim 7, wherein the method further comprises:

acquiring, in the image inputting apparatus, in a case where a content of a storing unit of the image inputting apparatus is in a predetermined state, identification information of the recording medium from the recording medium and causing the certification apparatus to perform certification based on user identification information and a password, which corresponds to the identification information, and transferring, in the image inputting apparatus, the user identification information and the password to the information processing apparatus, wherein the information processing apparatus acquires the access right to the delivery destination of the image data using the user identification information and the password, which are transferred by the transferring.

\* \* \* \* \*